March 27, 1951 — D. L. MILLER — 2,546,948
ENGINE STARTER GEARING
Filed Aug. 8, 1949

INVENTOR.
Donald L. Miller
BY Clinton S. Janes
ATTORNEY

WITNESS:
Esther M. Stockton

Patented Mar. 27, 1951

2,546,948

UNITED STATES PATENT OFFICE 2,546,948

ENGINE STARTER GEARING

Donald L. Miller, Elmira, N. Y., assignor to Bendix Aviation Corporation, Elmira Heights, N. Y., a corporation of Delaware Application August 8, 1949, Serial No. 109,107

6 Claims. (Cl. 74—7)

The present invention relates to engine starter gearing, and more particularly to a heavy duty type of drive having special provisions for controlling the meshing operation and constituting a yielding driving connection.

It is an object of the present invention to provide a novel engine starter drive having means for effectively ensuring the traversal of the driving pinion into and out of mesh with the engine gear.

It is another object to provide such a drive incorporating a load-limiting yielding driving connection.

It is another object to provide such a device having novel means for preventing the pinion and its associated parts from rebounding toward the engine gear when the pinion is thrown out of mesh as the engine starts.

Further objects and advantages will be apparent from the following description taken in connection with the accompanying drawing in which Fig. 1 is a side elevation partly broken away and in section of a preferred embodiment of the invention showing the parts in idle position;

Figures 1, 2, 3:
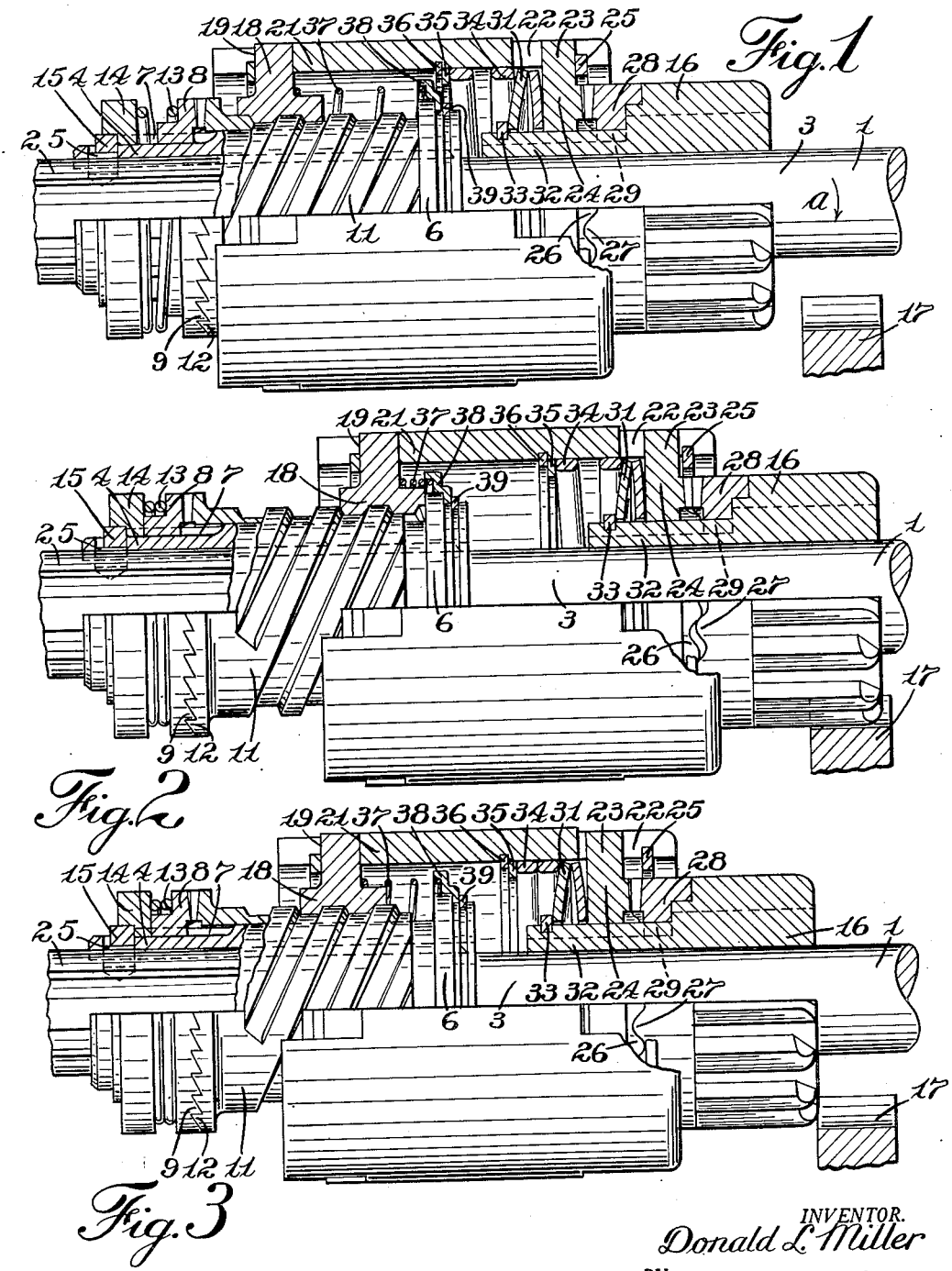
Fig. 2 is a similar view showing the parts in cranking position.
Fig. 3 is a similar view showing the parts in positions assumed when a tooth of the pinion abuts a tooth of the engine gear during the meshing operation.

In Fig. 1 of the drawing there is illustrated a power shaft 1 which may be the extended armature shaft of a starting motor not illustrated. Shaft 1 is splined for a portion of its length as indicated at 2 and is provided with a smooth reduced portion 3 extending beyond the splined portion. A sleeve 4 having internal grooves adapted to fit the splines on the power shaft 1, is non-rotatably mounted on the splined portion of the power shaft and is positioned thereon by suitable means such as a radial pin 5 traversing the sleeve and entering an opening in the power shaft.

Sleeve 4 is provided with a stop shoulder 6 at one end, and has external spline grooves 7 formed adjacent its other end on which is slidably mounted a driving overrunning clutch member 8 having teeth 9 formed thereon. A screw shaft 11 is slidably journalled on the intermediate portion of the sleeve 4 and is provided with teeth 12 adapted to cooperate with the teeth 9 of the driving overrunning clutch member 8. Means for yieldably urging the driving clutch member 8 into clutching engagement with the screw shaft 11, and the latter into abutting relation with the stop shoulder on sleeve 4, is provided in the form of a spring 13 seated on the driving clutch member 8 and bearing against an abutment ring 14 mounted on the end of the sleeve 4 and retained thereon by a lock ring 15 which also surrounds the pin 5 and maintains it in its seat. The abutment ring 14 is preferably formed as illustrated to surround the lock ring 15 and prevent its opening up by centrifugal force.

A pinion 16 is slidably journalled on the smooth portion 3 of the power shaft 1 for longitudinal movement into and out of engagement with a gear 17 of the engine to be started. Means for actuating the pinion from the screw shaft 11 is provided comprising a control nut 18 threaded on the screw shaft and fixedly connected as indicated at 19 to one end of a barrel member 21. The opposite end of the barrel member is slotted as shown at 22 to slidably receive the lugs 23 of a driving coupling member 24 which is retained in the end of the barrel by a lock ring 25. Coupling member 24 is provided with grooved projections or undulations 26 adapted to mate with similar undulations 27 of a driven coupling member 28 which is rigidly fixed as indicated at 29 to the pinion 16. Yielding means on the pinion is provided for compressing the coupling members 24, 28 in order to transmit cranking torque therethrough comprising a pair of spring discs 31 located on the extended hub 32 of the pinion and maintained under pressure against the driving coupling member 24 by means of a lock ring 33.

The pinion 16 is normally maintained in extended relation with respect to the barrel 21, with the lugs 23 of the driving coupling member 24 in engagement with the lock ring 25 in the barrel, by means of a mesh-enforcing spring 34 within the barrel bearing at one end against the periphery of the spring disc 31 and at its other end against a thrust washer 35 which bears against a lock ring 36 seated in the interior of the barrel.

An anti-drift spring 37 is seated at one end on the control nut 18, and at its other end bears against a thimble 38 which is retained on the stop shoulder 6 of sleeve 4 by means of a lock ring 39.

In operation, starting with the parts in the positions illustrated in Fig. 1, rotation of the power shaft in the direction of the arrow $a$ is transmitted through the sleeve 4 and driving clutch member 8 to the screw shaft 11 whereby the control nut 18 with its associated parts is traversed to the right so as to bring the pinion 16 into mesh with the engine gear 17 as shown in Fig. 2. As soon as the control nut 18 engages the stop shoulder 6, the screw shaft 11 is forced backward against the compression of the clutch spring 13 until the clutch member 8 engages the abutment ring 14, after which the control nut is forced to rotate with the screw shaft and torque is transmitted through the barrel 29 and coupling members 24, 28 to the pinion 16. If the initial torque due to the momentum of the rotating parts exceeds a predetermined maximum, the coupling members 24, 28 are forced apart against the action of the spring discs 31 and the undulations 26, 27 slide over each other until the excessive torque has been dissipated. Thereafter, the cranking torque is transmitted normally without slippage. When the engine starts, the parts are returned to their normal idle positions by the acceleration of the pinion 16 with its associated parts, the control nut 18 being arrested by the ends of the threads of the screw shaft 11, after which the control nut and screw shaft overrun the driving clutch member 8 until their momentum is dissipated. The parts are thereafter maintained in idle position by the anti-drift spring 37.

If, during the meshing operation, a tooth of the pinion should abut against a tooth of the engine gear as illustrated in Fig. 3, the longitudinal movement of the pinion is arrested, but the movement of the barrel 21 and control nut 18 is permitted to continue by virtue of the splined connection of the lugs 23 of the driving coupling member 24 with the end of the barrel 21. The mesh-enforcing spring 34 is thus compressed until the rotary component of the force transmitted through the screw shaft 11 becomes sufficient to index the pinion into proper registry with the tooth spaces of the engine gear 17, after which the mesh-enforcing spring 34 expands and snaps the pinion into initial mesh with the engine gear, whereupon the meshing and cranking operation continues as above set forth. Inasmuch as the only parts which are arrested in case of tooth abutment are the pinion 16 with coupling members 24, 28, which parts have comparatively little momentum, the mesh-enforcing operation takes place quietly and with very little shock.

During the cranking operation the screw-jack action of the screw shaft 11 and control nut 18 holds the overrunning clutch teeth 9, 12 in firm engagement. When the engine starts, however, this pressure is relieved and the clutch can overrun freely as permitted by the clutch spring 13.

Although but one embodiment of the invention has been shown and described in detail, it will be understood that other embodiments are possible and that changes may be made in the design and arrangement of the parts without departing from the spirit of the invention.

I claim:

1. In an engine starter drive, a power shaft, a sleeve fixedly mounted thereon having spline grooves at one end and a stop shoulder at the other; a screw shaft having clutch teeth at one end slidably journaled on the intermediate portion of said sleeve, a clutch member slidably but non-rotatably mounted on the splined portion of the sleeve, an abutment on the sleeve limiting movement of the clutch member away from the sleeve, yielding means urging the clutch member into driving engagement with the clutch teeth of the screw shaft, and normally holding the screw shaft against the stop shoulder on the sleeve; a control nut threaded on the screw shaft, a barrel member rigidly mounted at one end on the control nut, a pinion slidably journaled on the power shaft for longitudinal movement into and out of mesh with a gear on the engine to be started, having a driven coupling member fixed thereon, a driving coupling member non-rotatably mounted in the other end of the barrel member, and yielding means on the pinion urging the coupling members into driving engagement.

2. An engine starter drive as set forth in claim 1 in which said driving coupling member is splined in the end of the barrel member; and including further, abutment means for retaining the driving coupling member in the barrel member, and yielding means in the barrel member urging said driving coupling member toward the abutment means.

3. An engine starter drive as set forth in claim 1 in which the stop shoulder on the sleeve provides an abutment for limiting the meshing movement of the control nut; and including further yielding means between the control nut and the stop shoulder for urging the control nut toward idle position.

4. An engine starter drive as set forth in claim 1 in which said coupling members are provided with inter-engaging undulations, and the means on the pinion for urging the coupling members into driving engagement is arranged to yield and permit the undulations to ride over each other when a predetermined driving torque through the coupling members is exceeded.

5. An engine starter drive as set forth in claim 1 in which the drive shaft is provided with integral keys and the sleeve is provided with longitudinal grooves in its bore receiving said keys; and including further a pin traversing the sleeve radially and entering the power shaft to locate the sleeve thereon, and a lock ring mounted in the sleeve serving to retain said pin; said abutment on the sleeve being arranged to surround and seat against said lock ring.

6. A starter drive as set forth in claim 2 in which the yielding means on the pinion for urging the coupling members into driving engagement comprises a disc spring bearing against the driving coupling member, and the yielding means in the barrel for urging the driving coupling member toward its abutment in the barrel comprises a compression spring bearing against the periphery of said disc spring.

DONALD L. MILLER.

No references cited.